US012162240B2

(12) United States Patent
Picchi et al.

(10) Patent No.: US 12,162,240 B2
(45) Date of Patent: Dec. 10, 2024

(54) EMBOSSING GROUP

(71) Applicant: GAMBINI S.P.A., Milan (IT)

(72) Inventors: Fabio Picchi, Lammari (IT); Giovanni Buffa, Ponte Buggianese (IT); Paolo Lazzareschi, Lucca (IT)

(73) Assignee: GAMBINI S.P.A., Milan (IT)

( * ) Notice: Subject to any disclaimer, the term of this patent is extended or adjusted under 35 U.S.C. 154(b) by 0 days.

(21) Appl. No.: 18/312,636

(22) Filed: May 5, 2023

(65) Prior Publication Data

US 2023/0356495 A1 Nov. 9, 2023

(30) Foreign Application Priority Data

May 6, 2022 (IT) ........................ 102022000009404

(51) Int. Cl.
*B31F 1/07* (2006.01)

(52) U.S. Cl.
CPC ........ *B31F 1/07* (2013.01); *B31F 2201/0723* (2013.01)

(58) Field of Classification Search
CPC ........................... B31F 1/07; B31F 2201/0723
See application file for complete search history.

(56) References Cited

U.S. PATENT DOCUMENTS 3,957,414 A * 5/1976 Bussey, Jr. .............. B29C 59/06 425/384
4,877,487 A * 10/1989 Miller ..................... F28D 11/02 100/153
6,296,731 B1 * 10/2001 Fujii ..................... B29C 48/914 156/244.27
2001/0035257 A1 * 11/2001 Fujii ......................... F28F 5/02 156/760
2003/0131740 A1 * 7/2003 Butsch .................... B29C 59/04 101/6
2009/0255622 A1 10/2009 Hungler et al.
2010/0295206 A1 11/2010 McNeil
2010/0297279 A1 11/2010 McNeil
2010/0297280 A1 11/2010 McNeil
2010/0297286 A1 11/2010 Boatman et al.
2012/0168064 A1 7/2012 Hungler et al.
2012/0244241 A1 9/2012 McNeil
2012/0292821 A1 * 11/2012 Boegli ...................... B31F 1/07 264/293
2013/0153126 A1 * 6/2013 Knox ....................... B32B 37/15 156/499
2017/0355165 A1 * 12/2017 Gambini ................. D21F 11/08
2020/0198268 A1 * 6/2020 Ikeda ........................ F16G 1/28

OTHER PUBLICATIONS

Italian Search Report issued Dec. 5, 2022, in Italian Application 102022000009404 filed on May 6, 2022, 8 pages (with English Translation of Categories of Cited Documents and Written Opinion).

* cited by examiner

*Primary Examiner* — David H Banh
(74) *Attorney, Agent, or Firm* — Oblon, McClelland, Maier & Neustadt, L.L.P.

(57) ABSTRACT

An embossing group includes: a first embossing roller and at least one embossing unit associated with the first roller. The embossing unit includes a second embossing roller, a third embossing roller, and a sleeve surrounding the second roller and the third roller by coupling them. The sleeve faces the first roller and is configured to contact the first roller. The embossing unit and the first roller are configured to emboss at least one paper sheet wound between the first roller and the embossing unit.

11 Claims, 5 Drawing Sheets

EMBOSSING GROUP

BACKGROUND OF THE INVENTION

Field of the Invention

The present invention relates to an embossing group. The present invention also relates to an embossing and laminating machine comprising such an embossing group.

Description of the Related Art

The present invention is usefully applied for embossing paper of the so-called "tissue" type, i.e. toilet paper, kitchen paper and the like.

Multi-sheet laminated tissue paper rolls, usually consisting of two or three sheets, are known to be produced by embossing and laminating processes.

In particular, the embossing process consists in engraving reliefs, known as embossing, on each of the paper sheets, in order to provide a specific pattern, which is usually a decoration, on these sheets.

Embossing is known to be performed on a paper sheet by passing it between a pair of embossing rollers having side surfaces facing each other and placed at least partially in contact. Specifically, such pair of rollers comprises a first roller, generally made of steel, which has protuberances on its side surface adapted to imprint the aforementioned reliefs, namely the embossing, on the sheet. A second roller, i.e. a counter-roller, is also provided which is generally made of rubber, adapted to deform elastically when the protuberances of the first roller penetrate the paper sheet, making it possible to obtain embossing.

The laminating process, on the other hand, is adapted to couple two (or more) sheets of paper together.

It is also known in particular to carry out the lamination process with part of the same embossing rollers by means of embossing and laminating machines, wherein two or more different sheets from different pairs of embossing rollers are embossed and consequently laminated. Each pair of embossing rollers is in fact adapted to emboss a single sheet.

In such machines, lamination is performed with the aid of a glue unit that is associated with one of the pairs of embossing rollers, and in particular the first steel roller. Such a glue unit comprises a glue dispenser and a glue spreader roller, which apply and spread glue on one of the paper sheets as it is wound on the first roller. This sheet is then coupled to a second embossed sheet, which comes from the further pair of embossing rollers, by means of a pressure exerted by a coupling roller (so-called marriage roller) placed downstream of the pairs of embossing rollers.

It is known that the quality of the embossing process is proportionally related to the pressure pulse. In particular, the dimension of the contact area between the two rollers, and specifically the linear overlapping dimension between the two rollers along the feed direction, plays a key role in this magnitude. Such a dimension is known as "nip". The pressure pulse is in fact given by the product of the surface pressure and a given time in which the pressure acts on the nip, the so-called nip time.

Since the nip time is given by the ratio of the nip to the speed of the machine, the pressure pulse therefore increases as the nip increases.

A higher speed, on the other hand, which is desirable from a production point of view, is detrimental to the quality of the final product.

In order to increase the nip, and thus the pressure pulse, some solutions involve larger embossing rollers (especially the rubber roller). However, although an increase in diameter increases the contact area between the rollers, the increase in nip, and therefore in the nip time, is not significant. Furthermore, rollers having a larger size are disadvantageous in terms of footprint and thus accessibility to the embossing group.

BRIEF SUMMARY OF THE INVENTION

The task underlying the present invention is to provide an embossing group that enables the quality of the embossing process to be improved while increasing production.

It is in particular the object of the present invention to increase the pressure pulse, responsible for a good embossing of a paper sheet, by increasing the nip and thus the nip time.

Another object of the present invention is to provide a versatile embossing group, which may be adapted to different types of paper and allows for lower specific pressures, as envisaged in the case of embossing with heated steel rollers.

A further object of the present invention is to make available an embossing group that is easily accessible for an operator, where the rollers are small in size.

A further object of the present invention is to provide an embossing group that may be used in an embossing and laminating machine.

The task set forth above, as well as the objects mentioned and others which will become apparent hereinafter, are achieved by an embossing group as recited in claim 1.

Other features are provided in the dependent claims.

BRIEF DESCRIPTION OF THE SEVERAL VIEWS OF THE DRAWINGS

Further features and advantages will become clearer from the description of preferred but not exclusive embodiments of an embossing group shown only by way of a non-limiting example with the aid of the accompanying drawings, wherein.

DETAILED DESCRIPTION OF THE INVENTION

Figure 1:
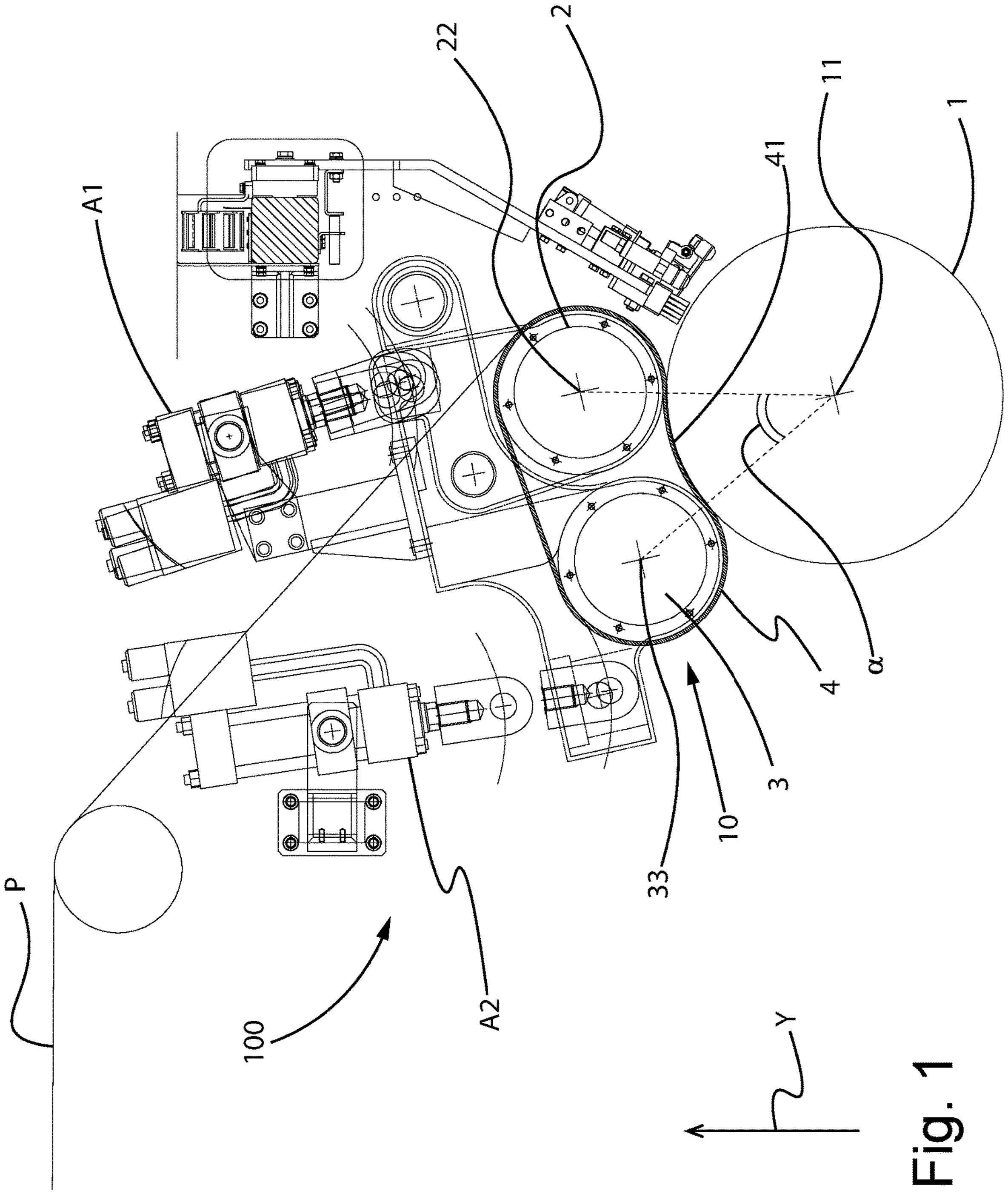
FIG. 1 shows a side view of an embossing group according to the present invention in a first configuration.

With reference to the attached Figures, an embossing group, denoted by reference number 100, is described hereinafter.

The embossing group 100 according to the present invention comprises a first embossing roller 1.

The embossing group 100 further comprises at least one embossing unit 10 associated with the first roller 1.

In particular, the embossing unit 10 comprises a second roller 2 and a third roller 3.

The embossing unit 10 comprises a sleeve 4 which surrounds the second roller 2 and the third roller 3, coupling them. In particular, the sleeve 4 is in contact with the second roller 2 and the third roller 3.

The sleeve 4 is facing the first roller 1 and is configured to contact the first roller 1.

In the embossing group 100 according to the present invention, the embossing group 10 and the first roller 1 are configured to emboss at least one paper sheet P wound between the first roller 1 and the embossing unit 10.

More specifically, the paper sheet P is configured to be placed between the sleeve 4 and the first roller 1 to be embossed, as shown in FIG. 1.

In greater detail, the first roller 1 is configured to rotate relative to a first central axis 11.

Such first roller 1 is preferably motorized.

The sleeve 4, on the other hand, is configured to be wound between the first roller 1 and the second and third rollers 2, 3. Thus, the sleeve 4 is rotated when it is in contact with the first roller 1 and when the first roller 1 is rotating.

Always preferably, the second roller 2 and the third roller 3 are both idle. Accordingly, the second roller 2 and the third roller 3 respectively have a second central axis 22 and a third central axis 33 around which they rotate when the sleeve 4 is in contact with the first roller 1 and when the first roller 1 is rotating.

The sleeve 4 has a contact zone 41 configured to contact the first roller 1. Such a contact zone 41 is a dynamic zone, i.e. defined on the surface of the sleeve 4 according to the position of the sleeve 4 itself as the sleeve 4 rotates.

The linear dimension of the contact zone 41 defines the so-called nip.

Thanks to the present invention, the nip can have, for example, a size of 200 mm.

More details on the contact zone 41 are given hereinafter.

The design of the embossing unit 10 according to the present invention allows the nip to be increased significantly.

Advantageously, it is therefore possible to obtain higher linear loads and higher pressure pulses, significantly increasing the quality of the embossing.

The first roller 1 is generally made of steel.

The sleeve 4, on the other hand, is preferably made of rubber.

On the other hand, the second roller 2 and the third roller 3 may be made of various materials, as they do not directly face the first roller 1, and therefore do not contact the paper sheet P to perform the embossing. For example, the second roller 2 and the third roller 3 are made of steel. Alternatively, the second roller 2 and the third roller 3 may also be made of plastic materials provided with a mechanical resistance adapted to support the pressure exerted by the first roller 1 when it is in contact with the sleeve 4.

Optionally, one or more of the first roller 1, second roller 2 and third roller 3 are provided with a convexity.

Preferably, the second roller 2 and the third roller 3 are spaced out from each other.

Note in particular that the contact zone 41 is defined as a function of the distance between the second roller 2 and the third roller 3. The contact zone 41 also depends on the mutual position of the second roller 2 and the third roller 3 with the first roller 1.

In particular, the second roller 2 and third roller 3 are arranged in such a way that the centres of the second roller 2 and third roller 3 form an angle α with the centre of the first roller 1 that is lower than 180°.

Always preferably, the second roller 2 and the third roller 3 are parallel. In other words, the second central axis 22 and the third central axis 33 are parallel to each other.

Still preferably, the first roller 1, the second roller 2 and the third roller 3 have the same length and are aligned in length.

In particular, the first roller 1, the second roller 2 and the third roller 3 have, respectively, a first board T1, a second board T2 and a third board T3 having the same length.

Preferably, the sleeve 4 also extends for a length equal to that of the second roller 2 and of the third roller 3 and is aligned in length to these second roller 2 and third roller 3.

Optionally, the embossing group 100 comprises alignment means (not shown in the accompanying Figures) to hold the sleeve 4 in position relative to the second roller 2 and third roller 3. Such alignment means for example take the form of hooks or guides provided between the second roller 2 and the sleeve 4 and between the third roller 3 and the sleeve 4.

Note that, preferably, the embossing group 100 according to the present invention comprises actuators A1, A2 configured to move the second roller 2 and the third roller 3.

Figure 2:
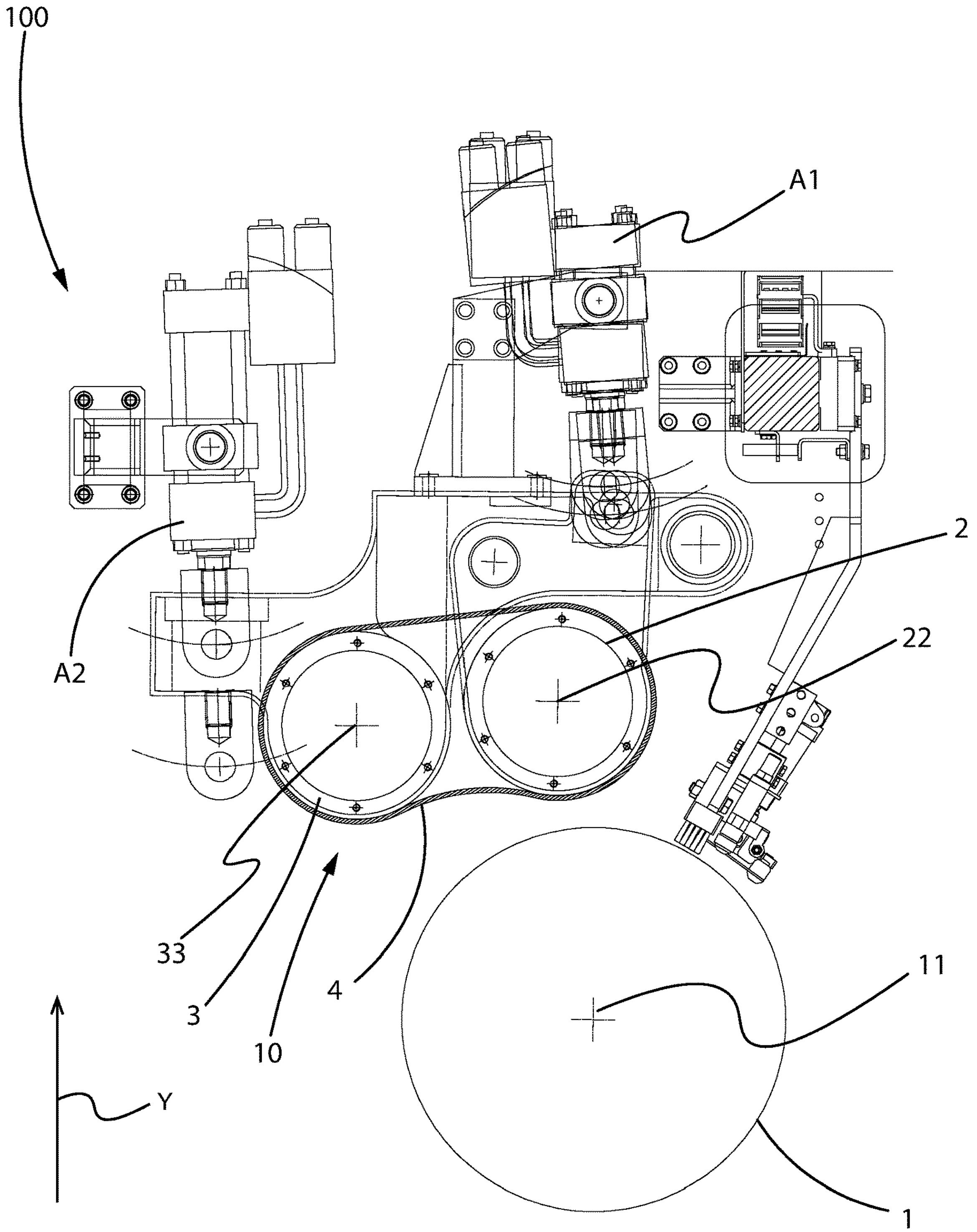
FIG. 2 shows a side view of an embossing group according to the present invention in a second configuration.

It is thereby possible, by moving the second roller 2 and the third roller 3, to move the embossing unit 10 between a stop configuration, wherein the embossing unit 10 is spaced from the first roller 1, and a use configuration, wherein the embossing unit 10 is in a position proximal to the first roller 1 and in particular the sleeve 4 is in contact with the first roller 1. FIG. 1 shows the embossing unit 10 in the use configuration while in FIG. 2 the embossing unit 10 is positioned in a stop configuration.

In particular, the embossing group 100 preferably comprises a first pair of actuators A1 associated with the second roller 2 and configured to move the second roller 2.

Still preferably, the embossing group 100 also comprises a second pair of actuators A2, associated with the third roller 3 and configured to move the third roller 3.

The actuators A1 of the first pair of actuators A1 are placed at the respective ends of the second roller 2.

The actuators A2 of the second pair of actuators A2 are placed at the respective ends of the third roller 3.

The actuators A1, A2 are preferably hydraulic cylinders.

More details on the actuators A1, A2 are given hereinafter in this description.

Figure 3:
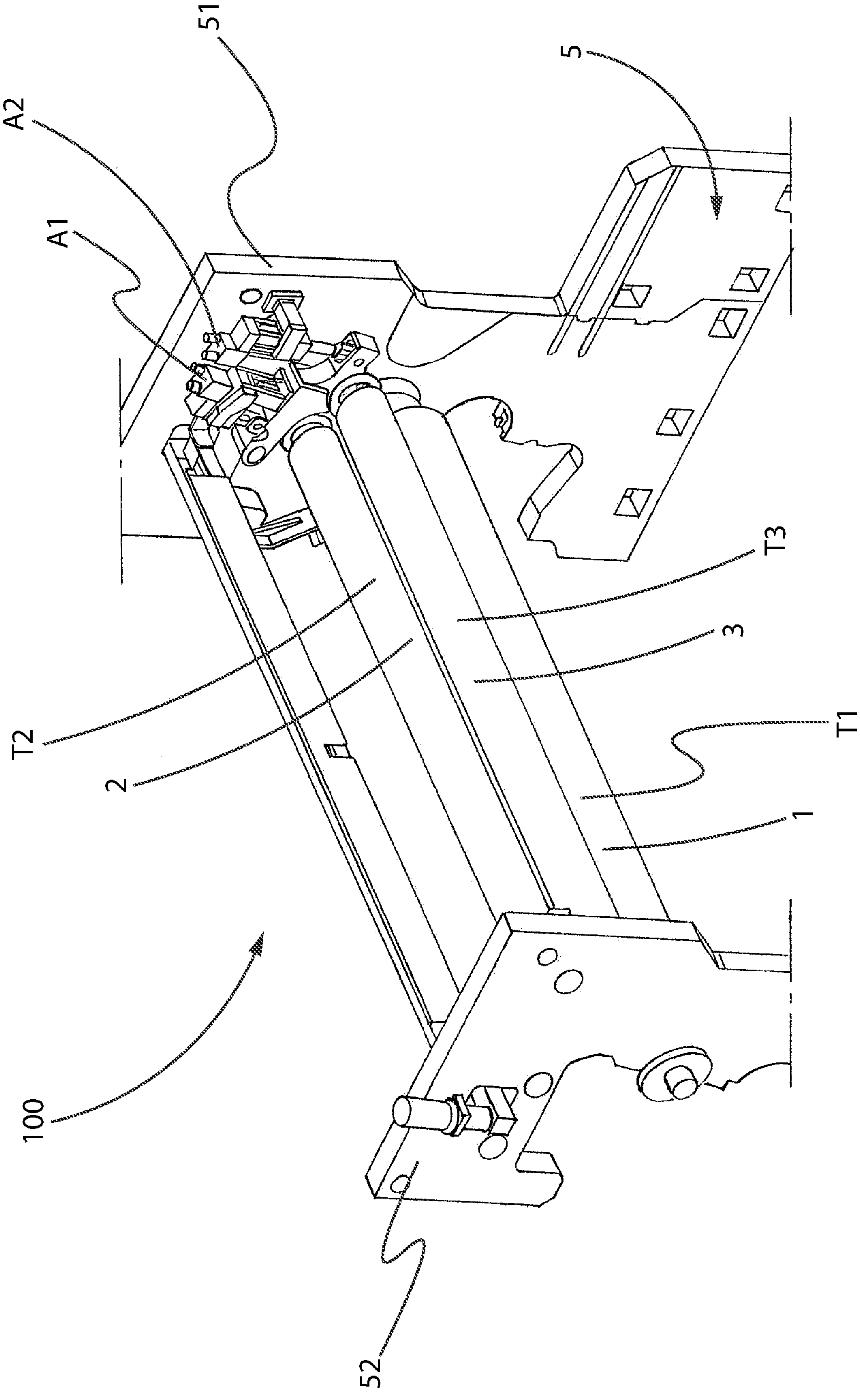
FIG. 3 shows a perspective view of a portion of the embossing group according to the present invention, with some parts removed to better see others.
Figure 4:
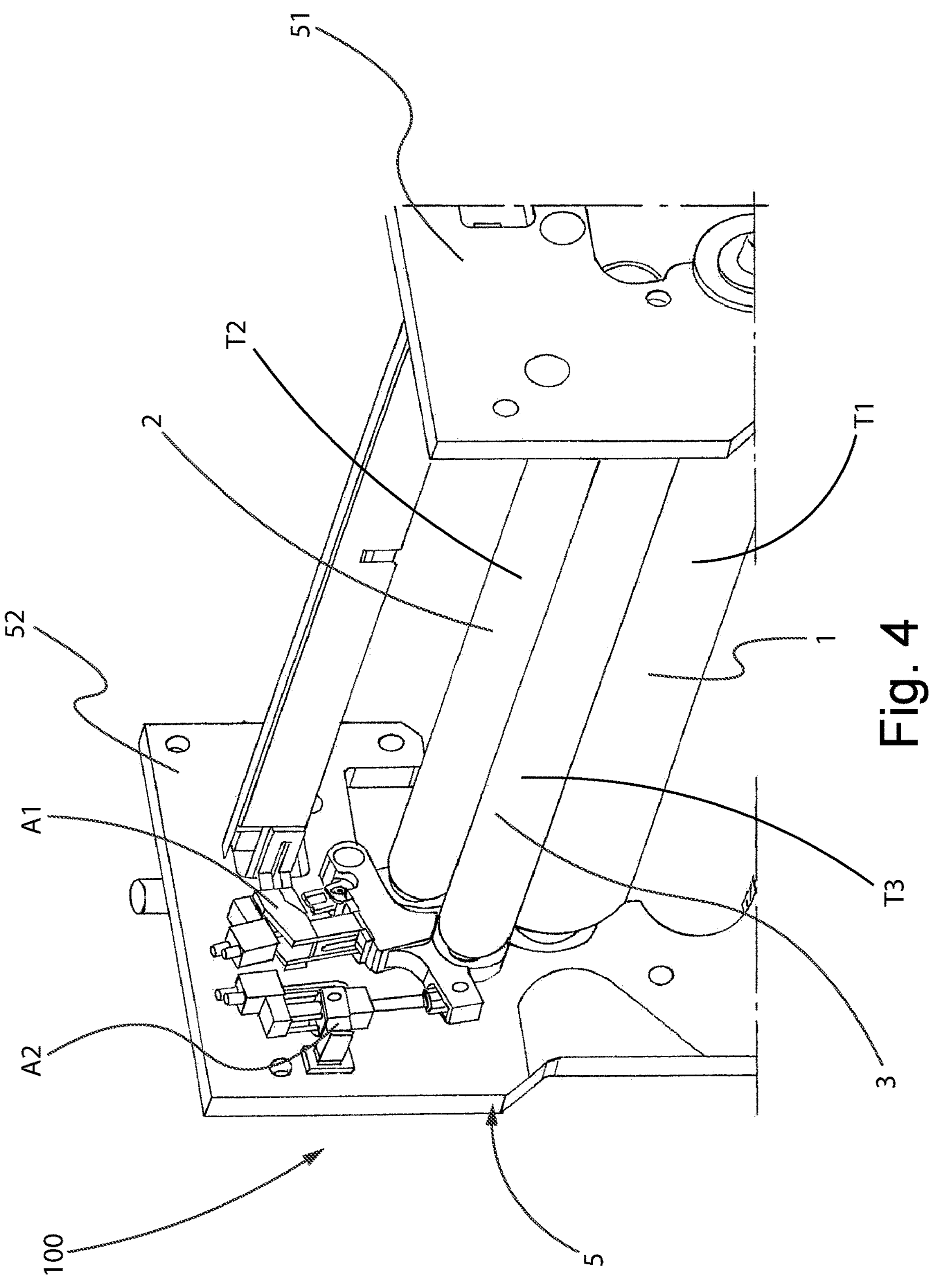
FIG. 4 shows a different perspective view of a portion of the embossing group in FIG. 3

The embossing group 100 also comprises a support structure 5 on which the embossing unit 10 and the first roller 1 are mounted, as shown in FIGS. 3 and 4.

For example, such a supporting structure 5 comprises a first sidewall 51 and a second sidewall 52, opposite to the first sidewall 51 and spaced apart from the first sidewall 51. To these first sidewall 51 and second sidewall 52 are constrained the respective ends of the first roller 1, and, indirectly, also of the second roller 2 and third roller 3.

In particular, the actuators of the first pair of actuators A1 and the actuators of the second pair of actuators A2 are connected to the first sidewall 51 and the second sidewall 52. Accordingly, the second roller 2 and the third roller 3 are connected to the supporting structure 5 via the actuators A1, A2.

It should also be noted that, according to a preferred embodiment, the second roller 2 and the third roller 3 are offset relative to a vertical direction Y.

According to a preferred embodiment, the above-mentioned first pair of actuators A1 and second pair of actuators A2 are distinct from each other. This makes it possible to move the third roller 3 independently of the second roller 2 and vice versa.

Advantageously, it is possible to adjust the tensioning of the sleeve 4.

Furthermore, according to such embodiment, it is also possible to vary the mutual position of the second roller 2 and the third roller 3. Advantageously, it is therefore possible to widen or narrow the size of the contact zone 41, and in particular of the nip.

In fact, by moving the second roller 2 and the third roller 3 from opposite sides with respect to the vertical direction Y, it is possible to move them away from each other, increasing the contact area 41 and also tensioning the sleeve 4 to a greater extent. On the other hand, by moving the second roller 2 and the third roller 3 closer to each other, the tension of the sleeve 4 decreases, as does the contact area 41.

Figure 5:
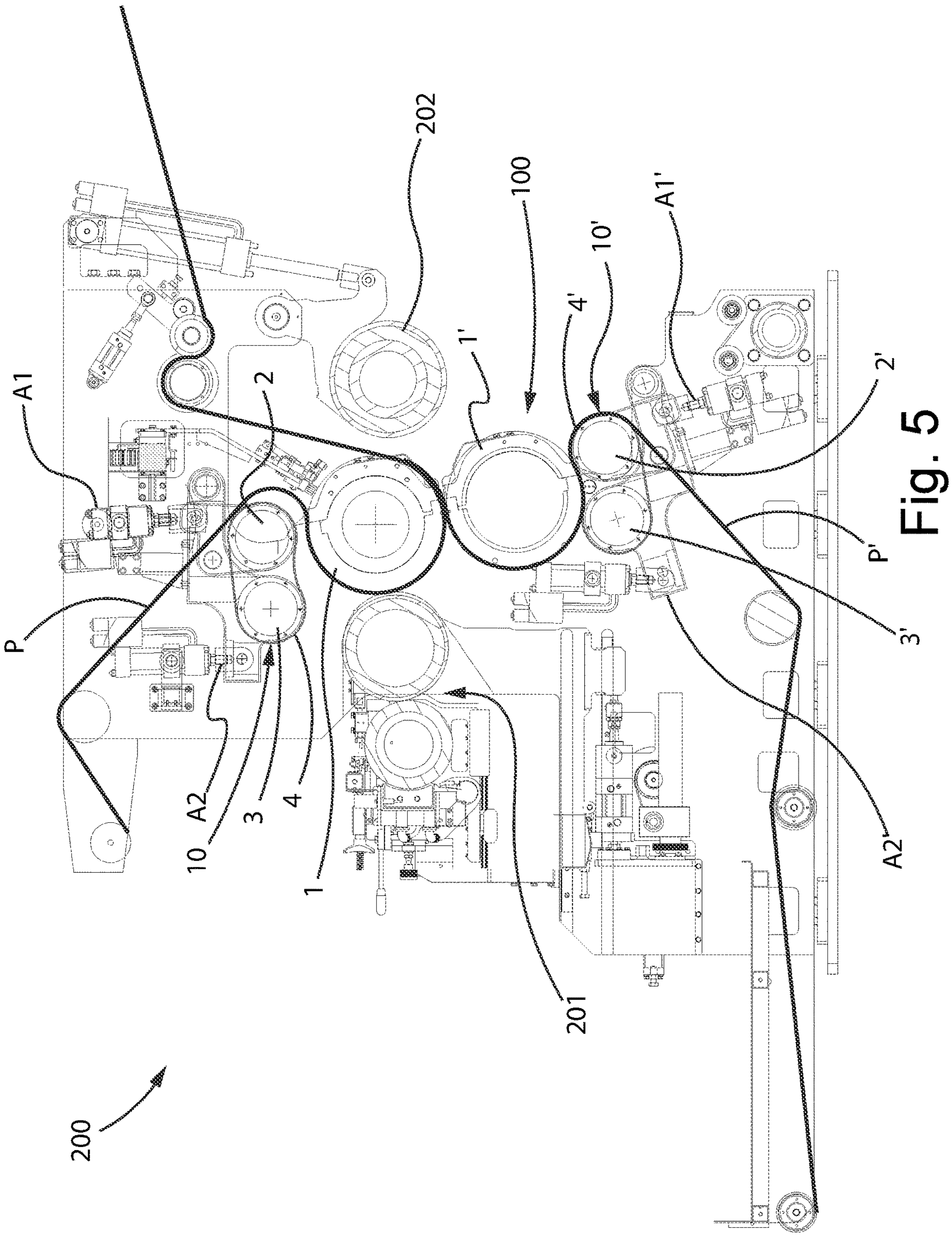
FIG. 5 shows a side view of an embossing and laminating machine according to the present invention.

According to a further embodiment, for example shown in FIG. 5, the embossing group 100 comprises at least one further first embossing roller 1' and at least one further embossing unit 10' similar to the embossing unit 10 described above, each associated with the respective first roller 1'.

Advantageously it is possible to carry out an embossing process on one or more paper sheets P, P' at the same time.

In particular, an embossing and laminating machine 200, in which the embossing and laminating processes are carried out one after the other, where the embossing group 100 is partially used to carry out the laminating process, is also a part of the present invention.

Still referring to FIG. 5, the embossing and laminating machine 200 comprises an embossing group 100 as described above as well as a glue unit 201 and a coupling roller 202.

Such embossing group 100 of the embossing and laminating machine 200 comprises two first rollers 1, 1' and two embossing units 10, 10'.

In particular, the embossing group 100 comprises a first upper roller 1 and a first lower roller 1'. The embossing group 100 also comprises an upper embossing unit 10, coupled to the first upper roller 1, and a lower embossing unit 10', coupled to the first lower roller 1'.

Accordingly, the embossing group 100 comprises a second upper roller 2, a third upper roller 3 and an upper sleeve 4, as well as a second lower roller 2', a third lower roller 3' and a lower sleeve 4'.

The embossing group 100 therefore comprises a first and a second pair of upper actuators A1, A2 associated respectively with the second upper roller 2 and the third upper roller 3 of the upper embossing unit 10 and a first and a second pair of lower actuators A1', A2' associated respectively with the second lower roller 2' and the third lower roller 3' of the lower embossing unit 10.

A first paper sheet P is wound between the first upper roller 1 and the upper embossing unit 10, and a second paper sheet P' is wound between the first lower roller 1' and the lower embossing unit 10'.

In FIG. 5 in particular, the upper embossing unit 10 is shown in a stop configuration, i.e. it is spaced from the first upper roller 1. Instead, the lower embossing unit 10' is shown in a use configuration, i.e. in contact with the first lower roller 1'.

The glue unit 201 is configured to distribute and spread glue on at least one paper sheet P, P' embossed by means of the embossing group 100. Said glue unit 201 is preferably placed downstream of the upper embossing unit 10 and at the respective first upper roller 1 associated with said upper embossing unit 10, in order to act on the paper sheet P being fed on the first upper roller 1 due to the rotation of the first upper roller 1 itself.

The coupling roller 202, on the other hand, is designed to couple two distinct paper sheets P, P', preferably from two distinct pairs of first roller 1, 1' and embossing unit 10, 10'. The coupling roller 202 is placed downstream of the embossing group 100 and the glue unit 201. In particular, the coupling roller 202 is placed at the first upper roller 1, with which the glue unit 201 is also associated.

In FIG. 5, the coupling roller 202 is shown in a stop configuration, i.e. offset from the first upper roller 1.

The embossing group 100 and the embossing and laminating machine thus conceived are susceptible to numerous modifications and variations, all within the scope of the inventive concept; moreover, all the details may be replaced by technically equivalent elements. In practice, the materials used, as long as they are compatible with the specific use, as well as the dimensions and the contingent shapes, may be any according to the technical requirements.

The invention claimed is:

1. An embossing group comprising:

a first embossing roller;

at least one embossing unit associated with said first roller, said embossing unit comprising:

a second roller;

a third roller; and a sleeve surrounding the second roller and the third roller by coupling the second roller and the third roller together; said sleeve facing said first roller and being configured to contact said first roller; said embossing unit and said first roller being configured to emboss at least one paper sheet wound between said first roller and said embossing unit;

a first pair of actuators associated with the second roller and configured to move said second roller; and a second pair of actuators distinct from said first pair of actuators, said second pair of actuators being associated with the third roller and configured to move said third roller independently of said second roller.

2. The embossing group according to claim 1, further comprising:

a further first roller; and a further embossing unit, associated with the further first roller, wherein said further embossing unit comprises a further second roller, a further third roller, a further sleeve surrounding the further second roller and the further third roller by coupling the further second roller and the further third roller together; said further sleeve facing said further first roller and configured to contact said further first roller; said further embossing unit and said further first roller being configured to emboss the at least one paper sheet wound between said further first roller and said further embossing unit.

3. The embossing group according to claim 1, wherein:

said first roller is motorized and is configured to rotate with respect to one axis of the first roller;

said sleeve is configured to be placed in rotation when in contact to said first roller and when said first roller is rotating;

said second roller and said third roller being both idle.

4. The embossing group according to claim 1, wherein said second roller and said third roller are parallel.

5. The embossing group according to claim 1, wherein said first roller, second roller and third roller have a same length and are aligned in length.

6. The embossing group according to claim 5, wherein said sleeve extends for a length equal to that of the second roller and of the third roller and is aligned in length to said second roller and third roller.

7. The embossing group according to claim 1, wherein said second roller and said third roller are offset with respect to a vertical direction.

8. The embossing group according to claim 1, further comprising alignment means to keep said sleeve in position with respect to said second roller and third roller.

9. An embossing and laminating machine comprising:

an embossing group according to claim 1;

a glue unit, configured to distribute and spread glue on at least one paper sheet embossed by means of said embossing group; and a coupling roller, placed downstream of said embossing group and said glue unit.

10. The embossing group according to claim 1, further comprising a supporting structure on which the embossing unit and the first roller are mounted, the supporting structure including a first sidewall and a second sidewall opposite to and spaced apart from the first sidewall, wherein the first pair of actuators and the second pair of actuators are connected to the first sidewall and the second sidewall such that the second roller and the third roller are connected to the supporting structure via the first pair of actuators and the second pair of actuators.

11. The embossing group according to claim 1, wherein the sleeve is made of rubber.

* * * * *